(12) United States Patent
Ha et al.

(10) Patent No.: US 11,539,076 B2
(45) Date of Patent: Dec. 27, 2022

(54) ELECTROLYTE AND LITHIUM SECONDARY BATTERY COMPRISING SAME

(71) Applicant: LG CHEM, LTD., Seoul (KR)

(72) Inventors: Yeyoung Ha, Daejeon (KR); Kihyun Kim, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 281 days.

(21) Appl. No.: 16/768,982

(22) PCT Filed: May 10, 2019

(86) PCT No.: PCT/KR2019/005637
§ 371 (c)(1),
(2) Date: Jun. 2, 2020

(87) PCT Pub. No.: WO2019/221456
PCT Pub. Date: Nov. 21, 2019

(65) Prior Publication Data
US 2021/0226252 A1     Jul. 22, 2021

(30) Foreign Application Priority Data

May 14, 2018  (KR) .......... 10-2018-0054612
May 9, 2019   (KR) .......... 10-2019-0054060

(51) Int. Cl.
*H01M 10/0567* (2010.01)
*H01M 50/417* (2021.01)
(Continued)

(52) U.S. Cl.
CPC ....... *H01M 10/0567* (2013.01); *H01M 4/382* (2013.01); *H01M 10/052* (2013.01);
(Continued)

(58) Field of Classification Search
None
See application file for complete search history.

(56) References Cited

U.S. PATENT DOCUMENTS

2003/0124433 A1   7/2003   Kim et al.
2014/0160549 A1   6/2014   Sandberg et al.
(Continued)

FOREIGN PATENT DOCUMENTS

CN   106099181     *   4/2015
CN   106099181  A       11/2016
(Continued)

OTHER PUBLICATIONS

International Search Report issued in PCT/KR2019/005637 (PCT/ISA/210), dated Aug. 19, 2019.
(Continued)

*Primary Examiner* — Alix E Eggerding
(74) *Attorney, Agent, or Firm* — Birch, Stewart, Kolasch & Birch, LLP (57) ABSTRACT

An electrolyte for a lithium secondary battery and a lithium secondary battery including the same, and more specifically, an electrolyte for a lithium secondary battery that can uniformly maintain a lithium ion concentration on the surface of a lithium metal negative electrode to inhibit the growth of lithium dendrites, even if a small amount of an additive comprising a functional group forming a bond with lithium metal and a polyethylene oxide chain interacting with lithium ion is contained.

8 Claims, 5 Drawing Sheets

(51) Int. Cl.
  *H01M 4/38*     (2006.01)
  *H01M 10/052*   (2010.01)
  *H01M 10/0568*  (2010.01)
  *H01M 10/0569*  (2010.01)
  *H01M 4/02*     (2006.01)

(52) U.S. Cl.
  CPC ... *H01M 10/0568* (2013.01); *H01M 10/0569* (2013.01); *H01M 50/417* (2021.01); *H01M 2004/027* (2013.01); *H01M 2004/028* (2013.01); *H01M 2300/0028* (2013.01)

(56) References Cited

U.S. PATENT DOCUMENTS

2015/0162615 A1   6/2015   Eberle et al.
2015/0349310 A1   12/2015  Viner et al.

FOREIGN PATENT DOCUMENTS

| | | |
|---|---|---|
| JP | 3-208206 A | 9/1991 |
| JP | 2003-151626 A | 5/2003 |
| JP | 2014-512434 A | 5/2014 |
| JP | 2015-165481 A | 9/2015 |
| JP | 2017-517130 A | 6/2017 |
| KR | 10-2013-0116022 A | 10/2013 |
| KR | 10-2014-0027206 A | 3/2014 |
| KR | 10-2017-0012468 A | 2/2017 |
| KR | 10-2017-0098061 A | 8/2017 |

OTHER PUBLICATIONS

Walker et al., "Tunable Networks from Thiolene Chemistry for Lithium Ion Conduction", ACS Macro Letters, vol. 1, 2012, pp. 737-741.

* cited by examiner

ELECTROLYTE AND LITHIUM SECONDARY BATTERY COMPRISING SAME

TECHNICAL FIELD

This application claims the benefit of priority based on Korean Patent Application No. 10-2018-0054612 filed on May 14, 2018, and Korean Patent Application No. 10-2019-0054060 filed on May 9, 2019, and the entire contents disclosed in the references of these Korean patent applications are hereby incorporated as a part of the present specification.

The present invention relates to an electrolyte capable of inhibiting the growth of lithium dendrites to improve the performance of a battery in a lithium secondary battery comprising lithium metal as a negative electrode, and a lithium secondary battery comprising the same.

BACKGROUND ART

As the electric, electronic, communication, and computer industries rapidly develop, the demand for secondary batteries with high performance and high stability is increasing rapidly in recent years. In particular, in accordance with the trend of light weight, thinning, miniaturization, and portability of batteries and electronic products, secondary batteries, which are core components, are also required to be light in weight and small in size. In addition, as the need for a new type of energy source has arisen due to environmental pollution problems and oil depletion, there has been an increasing need to develop an electric vehicle capable of solving these problems. Among various secondary batteries, lithium secondary batteries, which are light in weight, exhibit high energy density and operating potential, and have a long cycle life, are in the spotlight recently.

The lithium secondary battery has a structure in which an electrode assembly comprising a positive electrodepositive electrode, a negative electrode, and a separator interposed between the positive electrodepositive electrode and the negative electrode is laminated or wound, and is constituted by embedding the electrode assembly in a battery case and injecting a non-aqueous electrolytic solution thereinto. At this time, the capacity of the lithium secondary battery differs depending on the kind of the electrode active material, and it is not being commercialized because a sufficient capacity is not secured as much as the theoretical capacity at the time of actual operation.

For the high-capacity of the lithium secondary battery, a metallic material such as silicon (4,200 mAh/g) and tin (990 mAh/g), which exhibits high storage capacity characteristics through the alloying reaction with lithium, is used as an negative electrode active material. However, if a metal such as silicon or tin is used as a negative electrode active material, the volume expands about 4 times as much during the charging process which is alloyed with lithium, and contracts during discharge. Due to the large volume change of the electrode which occurs repeatedly during such charging and discharging, the active material is gradually micronized to fall off from the electrode, whereby the capacity is drastically reduced, which makes it difficult to ensure stability and reliability, and commercialization has not been achieved.

Since the lithium metal has an excellent theoretical capacity of 3,860 mAh/g and a very low standard reduction potential (standard hydrogen electrode; SHE) of −3.045 V, as compared with the above-mentioned negative electrode active material, thereby enabling the realization of a high capacity and high energy density battery, a large amount of researches are being conducted on a lithium metal battery (LMB) using lithium metal as a negative electrode active material of a lithium secondary battery.

However, due to the high chemical/electrochemical reactivity of the lithium metal, the lithium metal battery easily reacts with electrolytes, impurities, lithium salts, and the like to form a passivation layer (solid electrolyte interlayer; SEI) on the surface of the electrode, and such a passivation layer results in a localized current density difference to form a dendrite in the form of a resin on the surface of the lithium metal. The lithium dendrite not only shortens the life of the lithium secondary battery, but also induces internal failure of battery and inert lithium (dead lithium), thereby increasing the physical and chemical instability of the lithium secondary battery, decreasing the capacity of the battery, shortening the cycle life, and adversely affecting the stability of the battery. In addition to them, since the passivation layer is thermally unstable, it may be gradually collapsed by increased electrochemical energy and heat energy when the battery is continuously charged/discharged, or particularly stored at a high temperature in a fully charged state. A side reaction, in which the lithium metal surface exposed due to the collapse of the passivation layer directly reacts with the electrolytic solvent to decompose, continuously occurs, thereby increasing the resistance of the negative electrode and reducing charging/discharging efficiencies of the battery. In addition, there are problems that the electrolytic solvent is consumed when the passivation layer is formed, and the life of the battery is reduced due to by-products and gases generated during various side reactions such as formation and collapse of the passivation layer and decomposition of the electrolyte.

Due to the high instability of the lithium metal as described above, a lithium metal battery using lithium metal as an negative electrode has not been commercialized.

In order to solve these problems, various methods such as introducing a protective layer on the surface of the lithium metal or varying the composition of the electrolyte have been studied.

For example, Korean Patent Application Laying-Open No. 10-2014-0027206 relates to an electrolyte composition in the form of a colloidal dispersion comprising a binder such as poly(ethylene glycol) dithiol in order to reduce its mobility in the electrolyte, which has the effect of reducing the mobility of the electrolyte and improving the ionic conductivity and/or the circulation performance due to the binder, but there is a disadvantage that a large amount of binder must be included in the electrolyte composition due to the use for the whole solid battery.

Therefore, it is required to develop an electrolyte that can prevent the growth of lithium dendrite by uniformly maintaining a lithium ion concentration on the surface of the lithium metal negative electrode even if only a small amount is added to the electrolyte for the lithium metal battery.

PRIOR ART REFERENCES

Patent Literature (Patent Literature 1) Korean Patent Application Laying-Open No. 10-2014-0027206

(Patent Literature 2) Chinese Patent Application Laying-Open No. 106099181

DISCLOSURE

Technical Problem

As a result of various researches to solve the above problems, the present inventors have confirmed that when an electrolyte comprising an additive such as polyethylene glycol was used as an electrolyte for a lithium secondary battery, a thiol group formed at one end of the polyethylene glycol formed a bond with lithium metal and a polyethylene oxide chain of the polyethylene glycol interacted with the lithium ion, and thus a drastic change in the lithium ion concentration on the surface of the lithium metal negative electrode was suppressed to inhibit the growth of lithium dendrite.

Accordingly, it is an object of the present invention to provide an electrolyte for a lithium secondary battery that can uniformly maintain a lithium ion concentration on the surface of a lithium metal negative electrode to inhibit the growth of lithium dendrite and improve battery performance.

It is another object of the present invention to provide the lithium secondary battery comprising the electrolyte for a lithium secondary battery.

Technical Solution

In order to achieve the above objects, the present invention provides an electrolyte for a lithium secondary battery, wherein the electrolyte may comprise an additive represented by following chemical formula 1:

$$SH-(CH_2-CH_2-O)n-X,\qquad \text{[Chemical Formula 1]}$$

wherein X is methyl or thiol, and n is an integer of 5 to 45.

The content of the additive represented by Chemical Formula 1 above may be more than 0% by weight and not more than 1.0% by weight, preferably 0.05 to 0.5% by weight, based on the total weight of the electrolyte.

The thiol (—SH) in the additive represented by Chemical Formula 1 above may be comprised in an amount of 1 to 30% by weight.

—$(CH_2-CH_2-O)_n$— in Chemical Formula 1 above may be linear or branched.

The electrolyte may further comprise an organic solvent and a lithium salt.

The organic solvent may be at least one selected from the group consisting of an ether solvent, an ester solvent, an amide solvent, a linear carbonate solvent, and a cyclic carbonate solvent.

The lithium salt may be at least one selected from the group consisting of LiFSI, LiPF$_6$, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_6$, LiAlCl$_4$, CH$_3$SO$_3$Li, CF$_3$SO$_3$Li, (CF$_3$SO$_2$)$_2$NLi, lithium chloroborane, and lithium 4-phenylborate.

The present invention also provides a lithium secondary battery comprising the electrolyte.

The lithium secondary battery may comprise a lithium metal negative electrode.

Advantageous Effects

The electrolyte for a lithium secondary battery according to the present invention may include a polyethylene glycol functionalized at the end to uniformly maintain a lithium ion concentration on the surface of a lithium metal negative electrode, thereby preventing the growth of lithium dendrite.

Specifically, when a thiol group is formed at one end of the polyethylene glycol, the thiol group forms a bond with the lithium metal and a polyethylene oxide chain of the polyethylene glycol interacts with the lithium ion, thereby being able to suppress a drastic change in the lithium ion concentration on the surface of the lithium metal negative electrode.

In addition, even if only a small amount of the polyethylene glycol functionalized at the end is comprised in the electrolyte for a lithium secondary battery, the effect of inhibiting the growth of lithium dendrite is excellent, and thus the overvoltage during charging and discharging of the lithium metal may be improved and the capacity to be expressed may be increased.

BEST MODE

Hereinafter, the present invention will be described in more detail in order to facilitate understanding of the present invention.

The terms and words as used in the present specification and claims should not be construed as limited to conventional or dictionary meanings, but should be construed as the meaning and concept consistent with the technical idea of the present invention based on the principle that the inventor can appropriately define the concept of the term to describe its own invention in the best way.

Electrolyte for Lithium Secondary Battery

The present invention relates to an electrolyte for a lithium secondary battery, and more specifically an electrolyte for a lithium secondary battery that can control the constitution of the additive to be comprised in the electrolyte, thereby uniformly maintaining a lithium ion concentration on the surface of a lithium metal negative electrode to control the growth of lithium dendrite.

At this time, the constitution of the additive to be comprised in the electrolyte may mean the kind, the mole fraction, and the structure of the functional group formed in the additive material.

The electrolyte for a lithium secondary battery according to the present invention may comprise a functional group-bonded polyethylene glycol as an additive.

Specifically, the additive in the electrolyte for a lithium secondary battery may be represented by following Chemical Formula 1:

$$SH-(CH_2-CH_2-O)n-X,\qquad \text{[Chemical Formula 1]}$$

wherein X is methyl ($CH_3$) or thiol (—SH), and n is an integer of 5 to 45.

The content of the additive represented by Chemical Formula 1 above may be more than 0% by weight and not more than 1.0% by weight, preferably 0.05 to 0.5% by weight, based on the total weight of the electrolyte. If the content of the additive represented by Chemical Formula 1 above is less than the above range, the lithium ion concentration is not uniform on the surface of the lithium metal negative electrode, and thus the lithium dendrite grows. If it exceeds the above range, there is a problem of side reaction due to decomposition of the additive.

In the additive represented by Chemical Formula 1 above, the thiol (—SH) formed at one end forms a bond with a lithium metal, and —($CH_2$—$CH_2$—O)— interacts with lithium ions, and thus the lithium ion concentration may be uniformly maintained on the surface of the lithium metal negative electrode.

Herein, the thiol (—SH) may be comprised in an amount of 1 to 30% by weight, preferably 1 to 20% by weight in the additive represented by Chemical Formula 1 above. At this time, the % by weight is based on the mass ratio of the thiol (—SH) comprised in the additive. If the content of the thiol is less than 1% by weight, it is difficult to form a bond with the lithium metal, and thus it is difficult to uniformly maintain the lithium ion concentration on the surface of the lithium metal negative electrode. If it is more than 30% by weight, the content of —SH becomes relatively excessive, and thus the decomposition of the additive and the side reaction with the lithium metal are accelerated.

In addition, in the additive represented by Chemical Formula 1 above, the polyethylene oxide chain (—($CH_2$—$CH_2$—O)$_n$—) may be linear or baranched.

In the additive represented by Chemical Formula 1 above, n means the length of the polyethylene oxide chain (—($CH_2$—$CH_2$—O)$_n$—), and if n is less than the above range, there is a problem that an effective complex with lithium ion is not formed, and if it exceeds the above range, there is a problem that the additive does not reach the surface of the lithium metal electrode.

In the present invention, the electrolyte for a lithium secondary battery may comprise an organic solvent. As the organic solvent, an ether, an ester, an amide, a linear carbonate, a cyclic carbonate, and the like, may be used alone or as a mixture of two or more.

As the ether compound, at lease one selected from the group consisting of dimethyl ether, diethyl ether, dipropyl ether, methyl ethyl ether, methyl propyl ether, ethyl propyl ether, dimethoxy ethane, diethoxy ethane, methoxy ethoxy ethane, ethylene glycol monomethyl ether, diethylene glycol dimethyl ether, diethylene glycol diethyl ether, diethylene glycol methyl ethyl ether, triethylene glycol dimethyl ether, triethylene glycol diethyl ether, triethylene glycol methyl ethyl ether, tetraethylene glycol dimethyl ether, tetraethylene glycol diethyl ether, tetraethylene glycol methyl ethyl ether, polyethylene glycol dimethyl ether, polyethylene glycol diethyl ether, polyethylene glycol methyl ethyl ether, 1,3-dioxolane, tetrahydrofuran, and 2-methyltetrahydrofuran may be used, but the ether compound is not limited thereto.

As the ester, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, or a mixture of two or more thereof may be used, but the ester is not limited thereto.

As specific examples of the linear carbonate compound, any one selected from the group consisting of dimethyl carbonate (DMC), diethyl carbonate (DEC), dipropyl carbonate, ethyl methyl carbonate (EMC), methyl propyl carbonate, and ethyl propyl carbonate, or a mixture of two or more thereof may be representatively used, but the linear carbonate compound is not limited thereto.

Specific examples of the cyclic carbonate compound are any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a mixture of two or more thereof. The halides thereof are, for example, fluoroethylene carbonate (FEC), and the like, but are not limited thereto.

In addition to the above-mentioned organic solvents, there are also N-methylpyrrolidone, dimethylsulfoxide, sulfolane, and the like.

The electrolyte for a lithium secondary battery of the present invention may further comprise a nitrate-based compound commonly used in the art in addition to the above-mentioned composition. For example, there are lithium nitrate ($LiNO_3$), potassium nitrate ($KNO_3$), cesium nitrate ($CsNO_3$), magnesium nitrate ($MgNO_3$), barium nitrate ($BaNO_3$), lithium nitrite ($LiNO_2$), potassium nitrite ($KNO_2$), cesium nitrite ($CsNO_2$), and the like.

In the present invention, the electrolyte for a lithium secondary battery may comprise a lithium salt as an electrolyte salt. The lithium salt is not particularly limited in the present invention, and may be used without limitation as long as it can be commonly used in an electrolyte for a lithium secondary battery.

For example, the lithium salt may comprise at least one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2NLi$, $(C_2F_5SO_2)_2NLi$, $(SO_2F)_2NLi$, $(CF_3SO_2)_3CLi$, lithium chloroborane, lower aliphatic lithium carbonate having 4 or less carbon atoms, lithium 4-phenylborate, and lithium imide. Preferably, the lithium salt may be lithium bis (trifluoromethanesulfonyl) imide (LiTFSI), and $(CF_3SO_2)_2NLi$.

The concentration of the lithium salt may be appropriately determined in consideration of ionic conductivity, solubility, and the like, and may be, for example, 0.1 to 4.0 M, preferably 0.5 to 2.0 M. If the concentration of the lithium salt is less than the above range, it is difficult to secure the ionic conductivity suitable for driving the battery, and, on the contrary, if it exceeds the above range, the viscosity of the electrolytic solution increases, and thus the mobility of lithium ion is lowered, and the decomposition reaction of the lithium salt itself increases, and thus the performance of the battery may be deteriorated. Accordingly, the concentration of the lithium salt must be appropriately adjusted within the above range.

Lithium Secondary Battery

The present invention provides a lithium secondary battery comprising the electrolyte for a lithium secondary battery.

The lithium secondary battery according to the present invention may comprise a lithium metal negative electrode, and may be, for example, a lithium metal battery, a lithium-sulfur battery, or the like.

The lithium secondary battery comprises a positive electrode, a negative electrode, and an electrolyte interposed between the positive electrode and the negative electrode, wherein the electrolyte comprises the electrolyte for a lithium metal battery according to the present invention.

The positive electrode may comprise a positive electrode current collector and a positive electrode active material applied on one side or both sides of the positive electrode current collector.

The positive electrode current collector is used for supporting the positive electrode active material and is not particularly limited as long as it has high conductivity without causing chemical change in the battery. For example, copper, stainless steel, aluminum, nickel, titanium, palladium, baked carbon, copper or stainless steel surface-treated with carbon, nickel, silver, or the like, aluminum-cadmium alloy, and the like may be used.

The positive electrode current collector may form fine prominence and depression on its surface to reinforce the bonding force with the positive electrode active material, and various forms such as a film, a sheet, a foil, a mesh, a net, a porous body, a foam, and a non-woven fabric may be used.

The positive electrode active material may comprise a positive electrode active material, and optionally a conductive material and a binder.

In the positive electrode active material, the positive electrode active material may be an oxide consisting of lithium and a transition metal having a structure capable of intercalating lithium, and may be represented by, for example, following Chemical Formula 2:

[Chemical Formula 2]

wherein, a=1, 0.1≤x≤0.3, 0.15≤y≤0.25, 0≤b≤0.05, and M may be any one selected from transition metal or lanthanide group elements selected from the group consisting of Al, Cr, Mn, Fe, Mg, La, Ce, Sr, V, Zn, and combinations thereof.

In particular, in the case of a lithium-sulfur battery, the positive electrode active material may be at least one selected from the group consisting of elemental sulfur ($S_8$); $Li_2S_n$ (n≥1); disulfide compounds such as 2,5-dimercapto-1,3,4-thiadiazole and 1,3,5-trithiocyanuic acid; and sulfur-containing compounds such as organosulphur compounds or carbon-sulfur polymers (($C_2S_x$)$_n$; x=2.5-50, n≥2). Preferably, inorganic sulfur ($S_8$) may be used.

The positive electrode may further comprise one or more additives selected from transition metal elements, IIIA group elements, IVA group elements, sulfur compounds of these elements, and alloys of these elements and sulfur in addition to the positive electrode active material.

The transition metal elements include Sc, Ti, V, Cr, Mn, Fe, Co, Ni, Cu, Zn, Y, Zr, Nb, Mo, Tc, Ru, Rh, Pd, Os, Ir, Pt, Au, Hg, and the like; the IIIA group elements include Al, Ga, In, Ti, and the like; and the IVA group elements may include Ge, Sn, Pb, and the like.

The conductive material is used for improving the electrical conductivity and is not particularly limited as long as it is an electronic conductive material that does not cause chemical change in the lithium secondary battery.

In general, carbon black, graphite, carbon fiber, carbon nanotube, metal powder, conductive metal oxide, organic conductive material, and the like may be used; and currently commercially available products as the conductive material include acetylene black series (Chevron Chemical Company or Gulf Oil Company products, etc.), Ketjen Black EC series (Armak Company products), Vulcan XC-72 (Cabot Company products), and Super P (MMM company products). For example, acetylene black, carbon black, graphite, and the like may be used.

In addition, the positive electrode active material may further comprise a binder which has a function of maintaining on the positive electrode current collector and connecting the active materials. As the binder, various kinds of binders such as polyvinylidene fluoride-hexafluoropropylene (PVDF-co-HFP), polyvinylidene fluoride (PVDF), polyacrylonitrile, polymethyl methacrylate, styrene butadiene rubber (SBR), carboxyl methyl cellulose (CMC), poly(acrylic acid) (PAA), and poly(vinyl alcohol) (PVA) may be used.

The negative electrode may comprise a negative electrode current collector and a negative electrode active material disposed on the negative electrode current collector. Alternatively, the negative electrode may be a lithium metal plate.

The negative electrode current collector is used for supporting the negative electrode active material and is not particularly limited as long as it has excellent conductivity and is electrochemically stable in the voltage range of the lithium secondary battery; and for example, copper, stainless steel, aluminum, nickel, titanium, palladium, baked carbon, copper or stainless steel surface-treated with carbon, nickel, silver, or the like, aluminum-cadmium alloy, and the like may be used.

The negative electrode current collector may form fine prominence and depression on its surface to reinforce the bonding force with the negative electrode active material, and various forms such as a film, a sheet, a foil, a mesh, a net, a porous body, a foam, and a non-woven fabric may be used.

The negative electrode active material may comprise a material capable of reversibly intercalating or deintercalating lithium ion ($Li^+$), a material capable of reacting with lithium ion to reversibly form a lithium-containing compound, a lithium metal, or a lithium alloy. The material capable of reversibly intercalating or deintercalating lithium ion ($Li^+$) may be, for example, crystalline carbon, amorphous carbon, or a mixture thereof. The material capable of reacting with lithium ion ($Li^+$) to reversibly form a lithium-containing compound may be, for example, tin oxide, titanium nitrate, or silicone. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg) calcium (Ca), strontium (Sr), barium (Ba), radium (Ra), aluminum (Al), and tin (Sn). Preferably, the negative electrode active material may be lithium metal, and specifically may be in the form of a lithium metal thin film or a lithium metal powder.

The method for forming the negative electrode active material is not particularly limited, and a layer or a film forming method commonly used in the art may be used. For example, a method such as compression, coating, and deposition may be used. Also, the metal lithium thin film formed on the metal plate by initial charging after assembling the battery without the lithium thin film in the current collector is also comprised in the negative electrode of the present invention.

The electrolyte comprises lithium ions, is used for causing an electrochemical oxidation or reduction reaction between the positive electrode and the negative electrode through them, and is as described above.

The injection of the electrolytic solution may be carried out at an appropriate step in the manufacturing process of the electrochemical element according to the manufacturing process and required physical properties of the final product. That is, it may be applied before the electrochemical element assembly or at the final step of the electrochemical element assembly.

A separator may be further provided between the positive electrode and the negative electrode as described above. The separator is used for physically separating both electrodes in the lithium secondary battery of the present invention and may be used without any particular limitations as long as it is commonly used as a separator in a lithium secondary battery, and in particular, it is preferable that the separator has a low resistance against the ion movement of the electrolyte and an excellent electrolytic solution absorption ability.

The separator may be made of a porous substrate, and the porous substrate may be any porous substrate commonly used in an electrochemical device, for example, a polyolefin-based porous film or a non-woven fabric, but is not particularly limited thereto.

Examples of the polyolefin-based porous film include membranes formed of polymers in which polyolefin-based polymers such as polyethylene, for example, high density polyethylene, linear low density polyethylene, low density polyethylene, and ultra high molecular weight polyethylene, polypropylene, polybutylene, and polypentene are used alone or as a mixture thereof.

The non-woven fabric may include non-woven fabrics formed of polymers in which, for example, polyethylene terephthalate, polybutylene terephthalate, polyester, polyacetal, polyamide, polycarbonate, polyimide, polyetheretherketone, polyethersulfone, polyphenylene oxide, polyphenylene sulfide, and polyethylene naphthalate, in addition to the polyolefin-based non-woven fabric are used alone or as a mixture thereof. The structure of the non-woven fabric may be a melt blown non-woven fabric or a spunbond non-woven fabric composed of long fibers.

The thickness of the porous substrate is not particularly limited, but may be 1 to 100 μm, preferably 5 to 50 μm.

The size and porosity of the pores present in the porous substrate are also not particularly limited, but may be 0.001 to 50 μm and 10 to 95%, respectively.

The lithium secondary battery according to the present invention may be subject to lamination, stacking, and folding processes of a separator and an electrode in addition to a general process such as winding.

The shape of the lithium secondary battery is not particularly limited and may be various shapes such as a cylindrical shape, a laminate shape, and a coin shape.

The present invention also provides a battery module comprising the lithium secondary battery as a unit battery.

The battery module may be used as a power source for medium and large-sized devices requiring high temperature stability, long cycle characteristics, high capacity characteristics, and the like.

Examples of the medium and large-sized devices include, but is not limited to, a power tool that is powered from an electric motor to move; an electric motor vehicle including an electric vehicle (EV), a hybrid electric vehicle (HEV), a plug-in hybrid electric vehicle (PHEV), and the like; an electric two-wheel vehicle including an electric bike (E-bike) and an electric scooter (E-scooter); an electric golf cart; and a power storage system.

EXAMPLES

Hereinafter, preferred examples will be provided to help to understand the present invention, but the following examples are only for illustrating the present invention, and it will be apparent to those skilled in the art that various changes and modifications can be made without departing from the scope and spirit of the present invention, and it is obvious that such changes and modifications fall within the scope of the appended claims.

Example 1: Preparation of Lithium-Sulfur Battery

The lithium metal negative electrode and the S/C positive electrode were positioned to face each other and a polyethylene (PE) separator was placed therebetween, and then, 70 μl of the electrolyte was injected to prepare a lithium-sulfur battery in the form of a coin cell.

As the electrolyte, an electrolytic solution (E1) containing 0.1% by weight of an additive was used, and the additive was polyethylene glycol methyl ether thiol (mPEG-SH; molecular weight: 800). The electrolytic solution (E1) uses DOL/DME (1:1, v/v) as a solvent and is an electrolytic solution containing 1 M LiTFSI and 3% by weight of $LiNO_3$ (DOL: dioxolane; DME: dimethoxyethane).

Comparative Examples 1: Preparation of Lithium-Sulfur Battery

A lithium-sulfur battery in the form of a coin cell was produced in the same manner as in Example 1, except that an electrolytic solution (E1) containing no additive was used as the electrolyte.

Example 2: Preparation of Lithium-Lithium Symmetric Battery

The lithium metal negative electrode and the lithium metal positive electrode were positioned to face each other and a polyethylene (PE) separator was placed therebetween, and then, 100 μl of the electrolyte was injected to prepare a lithium-lithium battery in the form of a coin cell.

As the electrolyte, an electrolytic solution (E2) containing 0.1% by weight of an additive was used, and the additive was polyethylene glycol methyl ether thiol (mPEG-SH; molecular weight: 800). The electrolytic solution (E2) uses DOL/DME (1:1, v/v) as a solvent and is an electrolytic solution containing 1 M LiTFSI (DOL: dioxolane; DME: dimethoxyethane).

Comparative Examples 2: Preparation of Lithium-Lithium Symmetric Battery

A lithium-lithium battery in the form of a coin cell was produced in the same manner as in Example 2, except that an electrolytic solution (E2) containing no additive was used as the electrolyte.

Example 3: Preparation of Lithium-Sulfur Battery

The lithium metal negative electrode and the S/C positive electrode were positioned to face each other and a polyethylene (PE) separator was placed therebetween, and then, 70 μl of the electrolyte was injected to prepare a lithium-sulfur battery in the form of a coin cell.

As the electrolyte, an electrolytic solution (E1) containing 0.1% by weight of an additive was used, and the additive was polyethylene glycol methyl ether thiol (mPEG-SH; molecular weight: 2,000).

Comparative Examples 3: Preparation of Lithium-Sulfur Battery

A lithium-sulfur battery in the form of a coin cell was produced in the same manner as in Example 3, except that an electrolytic solution (E1) containing no additive was used as the electrolyte.

Comparative Examples 4: Preparation of Lithium-Sulfur Battery

A lithium-sulfur battery in the form of a coin cell was produced in the same manner as in Example 3, except that an electrolytic solution (E1) containing 1.5% by weight of an additive was used as the electrolyte.

Example 4: Preparation of Lithium-Sulfur Battery

A lithium-sulfur battery was produced in the same manner as in Example 1, except that 4arm-PEG5k-SH (molecular weight: 5,000) was used as an additive for the electrolyte and the mass ratio of thiol in the additive is 3% by weight.

Comparative Examples 5: Preparation of Lithium-Sulfur Battery

A lithium-sulfur battery in the form of a coin cell was produced in the same manner as in Example 4, except that an electrolytic solution (E1) containing no additive was used as the electrolyte.

Experimental Example 1: Performance Experiment of Lithium-Sulfur Battery According to the Content of Additive and the Content of Thiol in Additive To evaluate the performance of the lithium-sulfur battery depending on whether or not the additive was comprised in the electrolyte, charging/discharging experiments were carried out for the lithium-sulfur batteries prepared in Example 1 and Comparative Example 1, respectively. The experimental condition was set to 0.6 mA·cm$^{-2}$ charging/0.6 mA·cm$^{-2}$ discharging or 1.2 mA·cm$^{-2}$ charging/1.2 mA·cm$^{-2}$ discharging condition.

Figure 1:
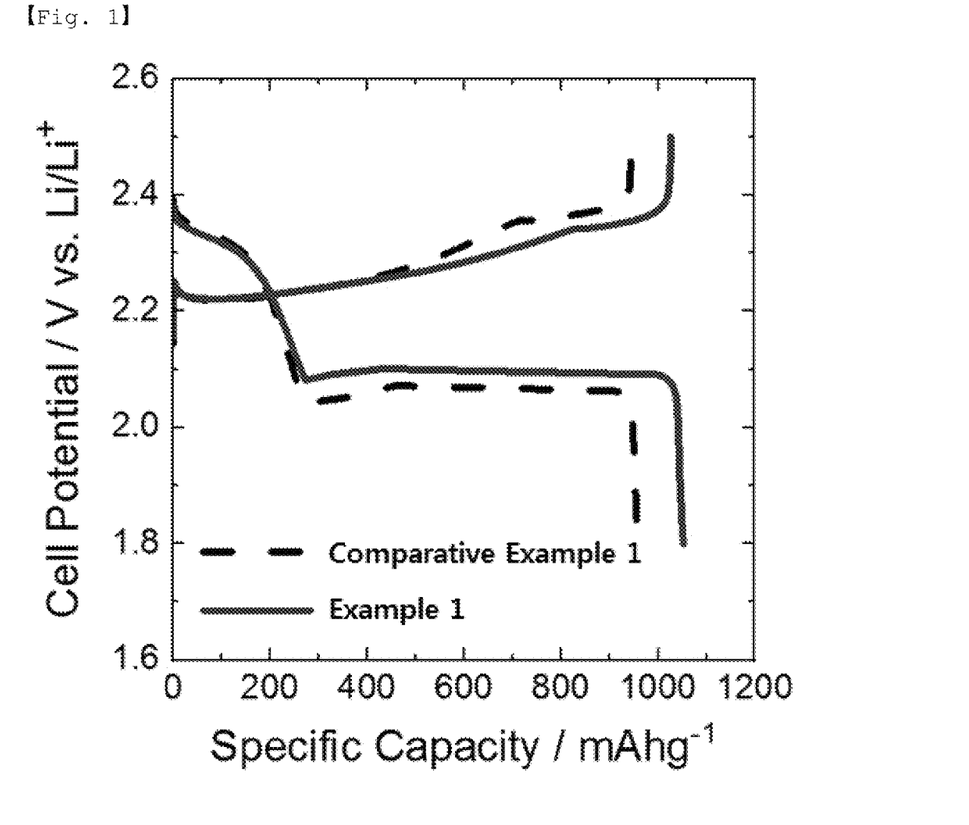
FIG. 1 shows the results of charging/discharging experiments for the lithium-sulfur batteries prepared in example 1 and comparative example 1, respectively.

FIG. 1 shows the results of charging/discharging experiments for the lithium-sulfur batteries prepared in Example 1 and Comparative Example 1, respectively.

Referring to FIG. 1, it can be seen that Example 1 comprising mPEG-SH as a additive for the electrolyte has an improved overvoltage and an increased expressed capacity during charging and discharging as compared with Comparative Example 1.

In addition, to evaluate the performance of lithium-sulfur batteries according to the content of additives comprised in the electrolyte, the performance evaluation for the lithium-sulfur batteries prepared in Example 3 and Comparative Examples 3 and 4, respectively, were carried out by measuring a discharging capacity and coulombic efficiency according to the progress of the charging/discharge cycles. The experimental condition was set to 0.6 mA·cm$^{-2}$ charging/0.6 mA·cm$^{-2}$ discharging and 1.2 mA·cm$^{-2}$ charging/1.2 mA·cm$^{-2}$ discharging condition and charging/discharging were carried out for 6 cycles, and then the discharging capacity was evaluated.

Figure 2:
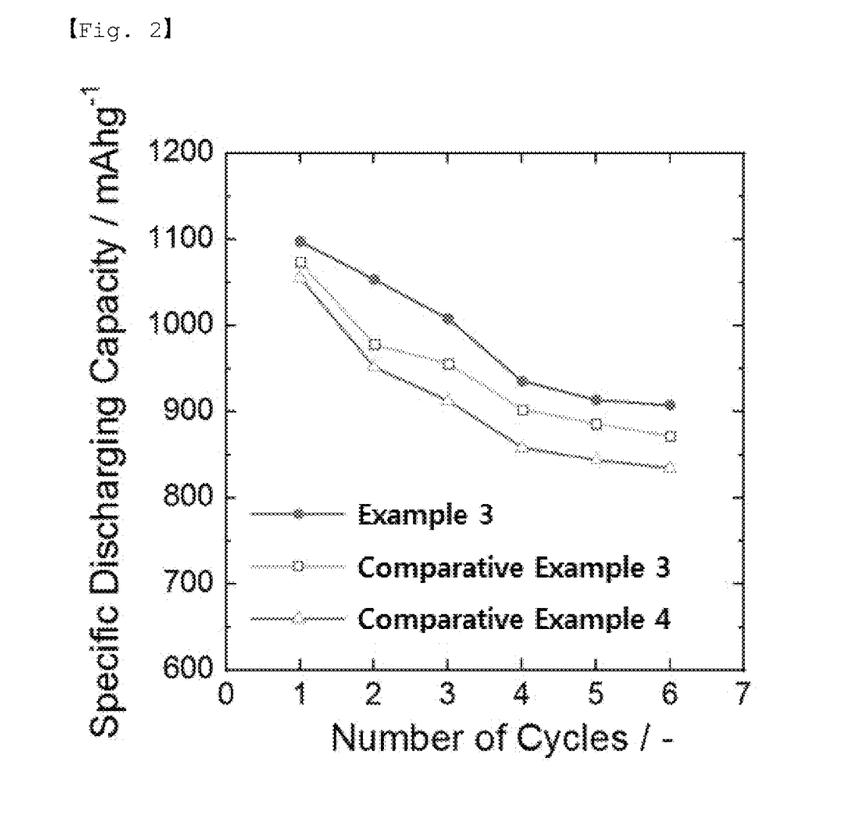
FIG. 2 shows the results of discharging capacity measurement experiments for the lithium-sulfur batteries prepared in example 3 and comparative examples 3 and 4, respectively.

FIG. 2 shows the results of discharging capacity measurement experiments for the lithium-sulfur batteries prepared in Example 3 and Comparative Examples 3 and 4, respectively.

Referring to FIG. 2, it was confirmed that Example 3 comprising mPEG-SH as a additive for the electrolyte exhibited a higher discharging capacity as compared with Comparative Examples 3 and 4 and it can be seen that from these results, when the additive for the electrolyte is added in an appropriate amount, it is advantageous in improving the performance of the battery.

In addition, to evaluate the performance of the lithium-sulfur battery according to the content of thiol (—SH) comprised in the additive for the electrolyte, charging/discharging experiments were carried out for the lithium-sulfur batteries prepared in Example 4 and Comparative Example 5, respectively. The experimental condition was set to the order of 3 cycles of 0.6 mA·cm$^{-2}$ charging/0.6 mA·cm$^{-2}$ discharging, 3 cycles of 1.2 mA·cm$^{-2}$ charging/1.2 mA·cm$^{-2}$ discharging, and then 1.8 mA·cm$^{-2}$ charging/3 mA·cm$^{-2}$ discharging conditions.

Figure 3:
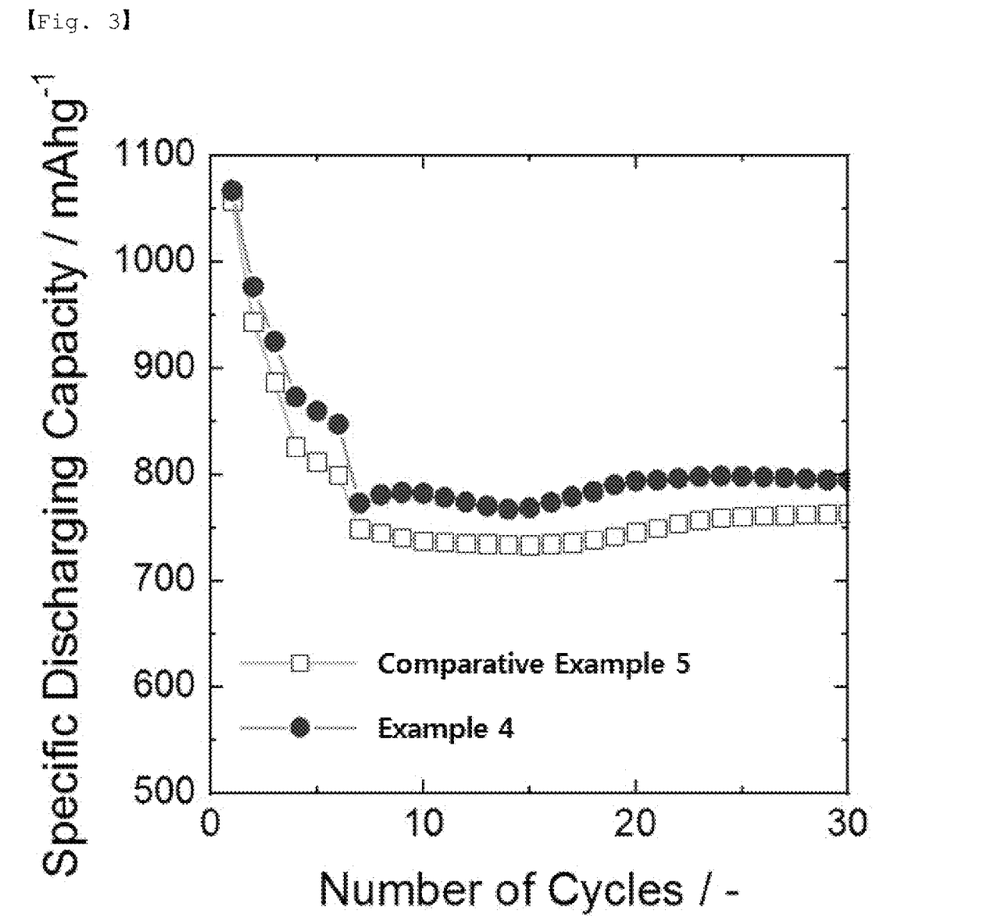
FIG. 3 shows the results of discharging capacity measurement experiments for the lithium-sulfur batteries prepared in example 4 and comparative example 5, respectively.

FIG. 3 shows the results of discharging capacity measurement experiments for the lithium-sulfur batteries prepared in Example 4 and Comparative Example 5, respectively.

Referring to FIG. 3, it can be seen that Example 4, in which 4arm-PEG5k-SH (molecular weight: 5,000) was used as an additive for the electrolyte and the mass ratio of thiol in the additive is 3% by weight, exhibits a higher discharging capacity as compared with Comparative Example 5, which contains no additive to have the thiol content of 0% by weight.

In addition, the surface of the lithium metal negative electrode was observed and compared after progressing the charging/discharging cycle for the lithium metal battery prepared in Example 2. The experimental condition was set to 1.3 mA·cm$^{-2}$ charging/1.3 mA·cm$^{-2}$ discharging condition and DOD is 83%, and charging/discharging were carried out for 10 cycles, and then the coin cell was disassembled to observe the surface of the lithium metal negative electrode.

Figure 4:
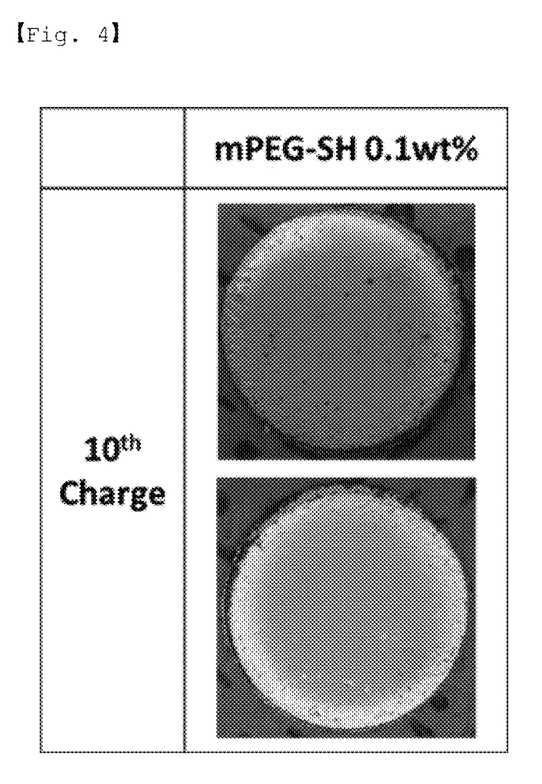
FIG. 4 is a photograph of the surface of a lithium metal negative electrode after charging and discharging the lithium metal battery prepared in example 2.

FIG. 4 is a photograph of the surface of a lithium metal negative electrode after charging/discharging the lithium metal battery prepared in Example 2 (a photograph taken after the same charging/discharging experiments were carried out 2 times.

Referring to FIG. 4, it can be confirmed that the lithium metal negative electrode of Example 2 exhibits a uniform surface shape even after the lithium metal battery was charged/discharged 10 times.

Experimental Example 2: Battery Performance Experiment when the Additive is Applied with Different Values of n in Chemical Formula 1

To evaluate the performance of the lithium-sulfur battery according to the value of n in Chemical Formula 1, which is an additive comprised in the electrolyte, charging/discharging experiments were carried out for the lithium-sulfur batteries prepared in Example 3 and Comparative Example 3, respectively. The experimental condition was set to the order of 2.5 cycles of 0.6 mA·cm$^{-2}$ charging/0.6 mA·cm$^{-2}$ discharging, 3 cycles of 1.2 mA·cm$^{-2}$ charging/1.2 mA·cm$^{-2}$ discharging, and 1.8 mA·cm$^{-2}$ charging/3.0 mA·cm$^{-2}$ discharging conditions.

Figure 5:
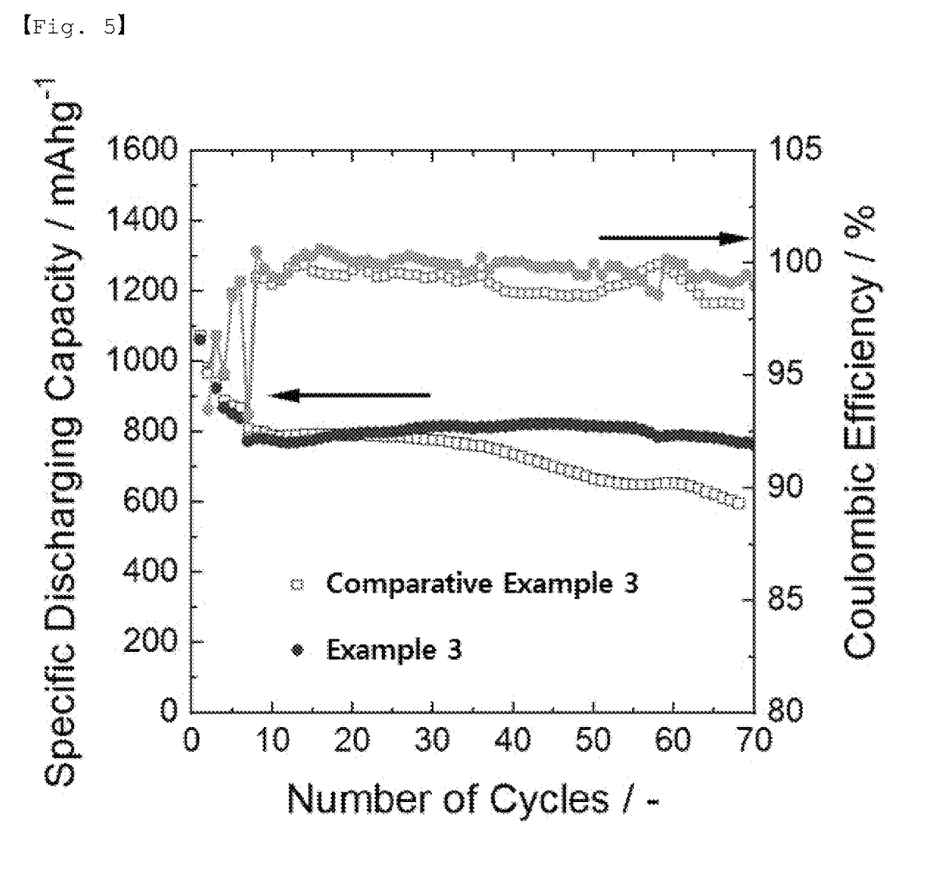
FIG. 5 shows the measurement results of a discharging capacity and coulombic efficiency according to the progress of charging/discharging cycles for the lithium-sulfur batteries prepared in example 3 and comparative example 3, respectively.

FIG. 5 shows the measurement results of a discharging capacity and coulombic efficiency according to the progress of charging/discharging cycles for the lithium-sulfur batteries prepared in Example 3 and Comparative Example 3, respectively.

Referring to FIG. 5, it can be seen that Example 3 comprising mPEG-SH as a additive for the electrolyte exhibits increased cycle life as compared with Comparative Example 3.

As described above, the present invention has been described with reference to the limited examples and drawings, but is not limited thereto, and it will be apparent to those skilled in the art that various changes and modifications may be made without departing from the spirit of the present invention and equivalents of the claims as defined below.

The invention claimed is:

1. An electrolyte for a lithium secondary battery, wherein the electrolyte comprises:
   an additive represented by following Chemical Formula 1:

SH—(CH$_2$—CH$_2$—O)n—X,     [Chemical Formula 1]

wherein X represents methyl or thiol, and n is an integer of 5 to 45, and
   wherein a content of the additive represented by Chemical Formula 1 is more than 0% by weight and not more than 1.0% by weight, based on a total weight of the electrolyte.

2. The electrolyte for a lithium secondary battery according to claim 1, wherein a content of thiol in the additive represented by Chemical Formula 1 is 1% by weight to 30% by weight.

3. The electrolyte for a lithium secondary battery according to claim 1, wherein the electrolyte further comprises
   an organic solvent; and
   a lithium salt.

4. The electrolyte for a lithium secondary battery according to claim 3, wherein the organic solvent is at least one selected from the group consisting of an ether solvent, an ester solvent, an amide solvent, a linear carbonate solvent, and a cyclic carbonate solvent.

5. The electrolyte for a lithium secondary battery according to claim 3, wherein the lithium salt is at least one selected from the group consisting of LiFSI, LiPF$_6$, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_6$, LiAlCl$_4$, CH$_3$SO$_3$Li, CF$_3$SO$_3$Li, (CF$_3$SO$_2$)$_2$NLi, lithium chloroborane, lithium 4-phenylborate, aliphatic lithium carbonate having 4 or less carbon atoms, and lithium imide.

6. A lithium secondary battery comprising the electrolyte according to claim 1.

7. The lithium secondary battery according to claim 6, wherein the lithium secondary battery comprises a lithium metal negative electrode.

8. The electrolyte for a lithium secondary battery according to claim 1, wherein the content of the additive is 0.05% by weight to 0.5% by weight, based on the total weight of the electrolyte.

* * * * *